Patented Jan. 6, 1925.

1,522,041

UNITED STATES PATENT OFFICE.

EDWARD BAGNALL-BULL, OF LONDON, ENGLAND.

INSECTICIDE, VERMIFUGE, SHEEP DIP, AND THE LIKE.

No Drawing.   Application filed July 22, 1924.   Serial No. 727,518.

*To all whom it may concern:*

Be it known that I, EDWARD BAGNALL-BULL, C. B. E., a subject of the King of Great Britain, residing at 12 Golders Green Parade, London, England, have invented certain new and useful Improvements Relating to Insecticides, Vermifuges, Sheep Dips, and the like, of which the following is a specification.

This invention refers to improvements relating to insecticides, vermifuges, sheep dips and the like, and it has for its object to provide improved means for the extraction in a concentrated form suitable for transport of an organic resin or compound obtainable from the root or other portions of the plants of the family known botanically as Derris or tuba of various species.

Heretofore it has been proposed to make extracts from plants of the Derris family for the above stated and known purposes but no proposals have previously been made to obtain extracts from fresh roots as hereinafter described.

It has been found in practice that once the Derris roots are allowed to dry the resins become colloidal or enter into such combination with the other materials that they can only be extracted by alcohol or some other solvent. My experience is that if the roots are treated while fresh, the whole of the resinous poisons can be extracted by means of water.

In carrying the present invention into effect and in order to obtain this Derris extract, I bruise, break or crush the fresh roots or other portions of the plant preferably between rollers. I then treat the broken or crushed roots or other portions of the plant with water which results in a milky emulsion or suspension of the juices of this plant containing toxic properties which is known as Derris or tuba and which is suitable in the preparation of insecticides, vermifuges, sheep dips and the like. To separate the emulsified substance from the water, in other words to separate the disperse phase from the dispersion medium, I may evaporate the whole or a part of same, preferably in vacuo, thereby obtaining a paste of a consistency suitable for transport, or I may add to the milky emulsion milk of lime which coagulates or precipitates the emulsified substance. The precipitate obtained by the last method is then freed from excess moisture by evaporation, by filtration or by centrifugalizing. Or it may be mixed with tartaric or any other suitable acid in quantity equivalent to the amount of lime contained in the precipitate. Or I may render the milky emulsion alkaline with soda carbonate to which is then added a brine or salt solution in a quantity sufficient to "salt out" the emulsified substance which then precipitates.

The emulsified substance or precipitate so obtained is then dried and ground or can be used in a moist condition, according to the use to which it is to be applied. Grinding produces a powder which, by reason of its fineness admits of a suspension of the drug in water.

This preparation may alone or mixed with inert powder be used as a dusting powder, or it may be mixed with soap, sulphur, or other suitable substance for use as insecticidal washes, sheep dips, or for spraying either as a powder or when mixed with water.

What I claim is:—

1. A method of obtaining Derris extract for use as an insecticide, vermifuge, sheep dip or the like, consisting in breaking or crushing the fresh roots or other portions of the plants of the family known botanically as Derris or tuba of various species, treating the same with water so as to obtain a milky emulsion or suspension of the juices containing toxic properties, and then separating the emulsified substance from the whole or a part of the water.

2. A method according to the preceding claim of obtaining Derris extract, according to which the water in the milky emulsion is evaporated so as to leave a paste of a consistency suitable for transport.

3. A method according to claim 1 of obtaining Derris extract, according to which milk of lime is added to the milky emulsion to coagulate or precipitate the emulsified substance which is then freed from excess moisture by suitable means such as by evaporation, by filtration or by centrifugalizing.

4. The method according to claim 1, of obtaining Derris extract, characterized by the fact that milk of lime is added to the milky emulsion to coagulate or precipitate the emulsified substance, after which the precipitate has added to it tartaric acid in quantity equivalent to the amount of lime contained in the precipitate.

5. An insecticide, vermifuge or the like comprising an extract of the Derris plant treated to obtain an emulsion or suspension of the juices containing the toxic properties, the extract being separated from the major portion of the material to provide a concentrate of the active principles of the juices.

In testimony whereof I have hereunto signed my name.

EDWARD BAGNALL-BULL.